INVENTOR.
John B. Clark

United States Patent Office 3,285,320
Patented Nov. 15, 1966

3,285,320
METHOD AND APPARATUS FOR CONTROLLING
FLOW OF FUEL GAS
John B. Clark, East Chicago, Ind., assignor to Standard
Oil Company, Chicago, Ill., a corporation of Indiana
Filed Dec. 10, 1965, Ser. No. 513,047
5 Claims. (Cl. 158—117.5)

This invention relates to an improved method and apparatus for controlling the flow of fuel gas to maintain constant heat input to a furnace or heater system. More particularly, this invention relates to a method and apparatus for automatically and continually maintaining constant heat input to a furnace or heater system when the fuel gas utilized is of varying B.t.u. value.

It will become apparent from a reading of this invention that the method and apparatus described may be utilized in many commercial applications. Therefore, while it is expedient to discuss the system of the invention in a specific industrial application, it is not intended that the invention be so limited.

It is often economically desirable to use gases produced from various industrial processes as fuel gas in process furnaces or the like. Often, for instance, one step in the treating of a hydrocarbon feedstock consists of heating the feedstock to a desired temperature in a process furnace. A problem arises, however, in the utilization of fuel gas for this purpose in that the composition of the fuel gas mixture often varies, and hence the B.t.u. value of the mixture will also vary. These variations in composition of the fuel gas mixture may be caused by, among other things, upsets in the process from which the gas is being derived. These upsets will cause one or more of the components to vary in amount and thus change the composition of the mixture. One method which is often employed in this situation is a flow control system which measures the outlet temperature of the feedstock and, based on variations from the desired temperature, controls the flow of fuel gas to the furnace and thus maintains the outlet temperature constant. However, it is found in practice that a change in the heating value of the fuel gas may cause considerable variation in the feedstock outlet temperature. This variation in temperature is due in part to the large heat capacity in the furnace and feedstock piping, and to the fact that the oil must travel completely through the furnace before its outlet temperature is measured. This, therefore, causes a large delay in the time necessary to correct the flow and bring the outlet temperature of the feedstock back to its desired level. Also, other systems which employ direct B.t.u. per cubic feet measurements are both expensive and slow.

As one example of its many applications, it has been discovered that this type of problem can be eliminated by employing the control system in accordance with this invention.

Briefly stated, this invention includes the method and apparatus for continually determining the specific gravity of the input fuel gas relating these determinations to the heating or B.t.u. value of the gas, and in response to these determinations, controlling the input flow of the fuel gas to the furnace or heater system so that much better control of process stream outlet temperature is obtained. A feature of this invention resides in determining the relationships between the specific gravity of various hydrocarbon gases and their heating or B.t.u. value. After determining the mathematical relationships of these two properties and properly programing a computer with these relationships, it becomes possible to automatically and continually maintain constant heat input to a furnace or heater system. This system then measures the variation in the specific gravity of the fuel gas, correlates these measurements with variation in heating or B.t.u. value, and in accordance with these correlations controls the input flow of fuel gas thereby maintaining constant heat input.

By employing the control system in accordance with this invention in the specific example being given, the large delay in the time necessary for the outlet temperature controller to detect and to correct the flow and bring the outlet temperature of the feedstock back to its desired level is eliminated. This result is brought about by the fact that the control system of this invention detects changes in the heating value of the input fuel gas and immediately applies a correction thereto, thus circumventing this large time delay.

The full nature of the invention will be understood from the accompanying drawings and the following description and claims.

Figure 1:
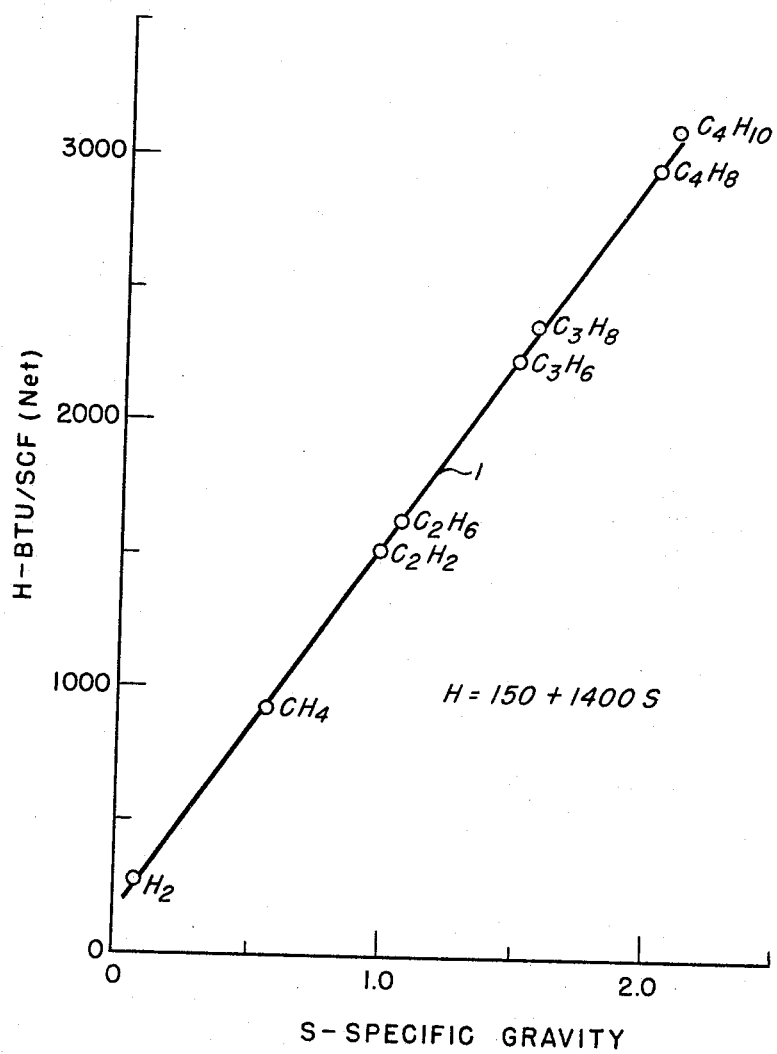
FIGURE 1 is a graph illustrating the relationships of B.t.u. value of various hydrocarbon gases versus specific gravity of these gases.

Referring now to FIGURE 1, line 1, represents the typical linear relationship between B.t.u. value and specific gravity of various hydrocarbon gases which normally make up the composition of the fuel gas mixture. A fuel gas mixture composed of any combination of these various gases will fall somewhere on line 1. The empirical formula of line 1 is $$H = 150 + 1400S$$

where H is B.t.u. value of the gas, and S is specific gravity of the gas. By programing a computing device with this formula and continually feeding specific gravity determinations to the computing device, it becomes possible to continually determine the heating or B.t.u. value of the input fuel gas.

Figure 2:
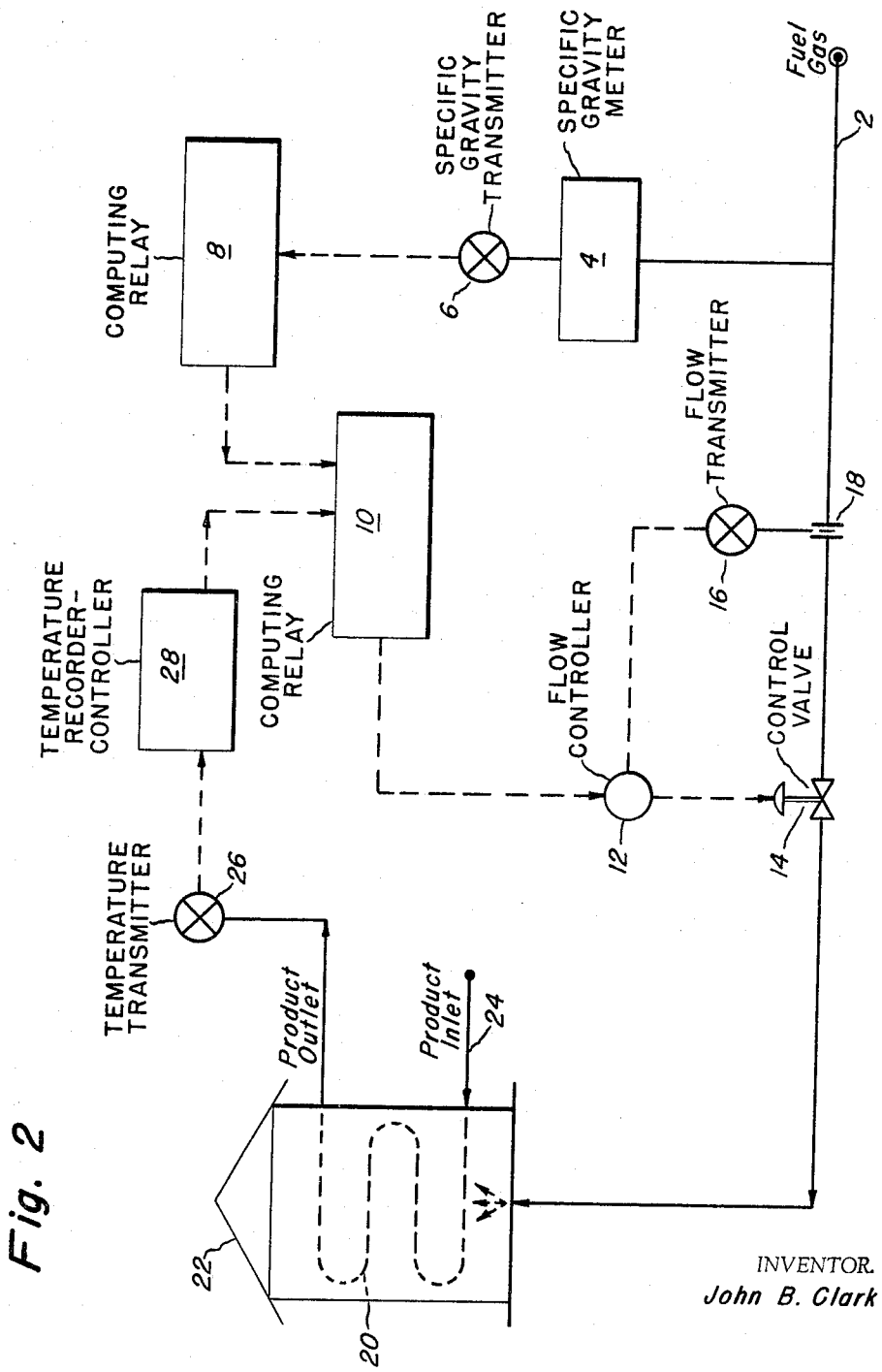
FIGURE 2 is a schematic representation of one embodiment of the control system in accordance with the invention. This embodiment is one example of how the control system of this invention might be utilized, and it is not intended to limit the scope of the invention in any way.

FIGURE 2 represents a process furnace used in heating a feedstock to a desired temperature. Stock enters furnace 22 through line 24 and is heated to the desired temperature as it circulates through coil 20. Fuel gas to furnace 22 enters via line 2. Flow transmitter 16 measures the pressure drop across an orifice 18 located in line 2 and transmits the measurement to flow controller 12 which in turn controls the flow of fuel gas by manipulating the position of control valve 14. The specific gravity of fuel gas entering line 2 is measured by specific gravity meter 4. The output signal from specific gravity meter 4 is fed by specific gravity transmitter 6 to computing relay 8, which converts the specific gravity signal into a signal which is proportional to the B.t.u. value of the fuel gas. The output signal from computing relay 8 is then fed into computing relay 10. Temperature transmitter 26 measures and feeds the outlet temperature of the product to temperature recorder controller 28. This signal from temperature recorder controller 28 is fed, in combination with the output signal from computing relay 8 into computing relay 10. Computing relay 10, by correlating the signal from temperature recorder controller 28 with the signal from computing relay 8, converts the signal from computing relay 8 into an output signal which is equal to the proper correction and transmits this corrected signal to flow controller 12 which then regulates control valve 14 thereby adjusting the input of fuel gas with changes in heating or B.t.u. value.

The individual components utilized in the control system of FIGURE 2 are standard commercial units and are readily available from numerous manufacturers. Examples of suitable components are a Ranarex specific gravity meter and transmitter for components 4 and 6, a Foxboro M-56 computing relay for component 8, and a Foxboro M-46 computing relay for component 10. While these components and the apparatus of the system as illustrated in FIGURE 2 utilize standard 3-15 p.s.i. pneumatic signals, apparatus utilizing electrical signals may suitably be employed.

A further embodiment of the invention provides for additional furnaces or heater systems to be fired with the same fuel. In this embodiment a plurality of furnaces may be controlled by providing in the system a computing relay 10 for each furnace or heater controlled.

Having thus described the invention, what is claimed is:

1. The method of automatically and continually controlling heat input to a gas-fired furnace utilizing fuel gas of varying heat content, which method comprises the steps of continually determining the specific gravity of said input fuel gas, said specific gravity determinations providing a measure of the heat content of said gas and in response to said determinations controlling the input flow of said gas to said furnace.

2. The method of automatically and continually maintaining the desired heat input to a gas-fired furnace equipped with a fuel gas flow controller where the input fuel gas is of varying specific gravity and heat content, which method comprises the steps of continually determining the specific gravity of said input gas, converting said specific gravity determinations into signals proportional to the heat content of said gas, and controlling the flow rate of fuel gas in response to said signals to automatically and continually govern the rate of input of said gas and maintain the desired heat input to said furnace.

3. The method of claim 1 wherein constant heat input is automatically and continually maintained in a plurality of gas-fired furnaces.

4. Apparatus for automatically and continually maintaining the desired heat input to a gas-fired furnace utilizing fuel gas of varying heat content, said apparatus comprising:

first means adapted to continually measure the specific gravity of said gas and produce a first signal proportional thereto;

second means adapted to receive said first signal and in response thereto produce a second signal proportional to the B.t.u. value of said gas; and third means adapted to receive said second signal and in response thereto automatically and continually control the input flow of said gas to maintain constant heat input to said furnace.

5. The apparatus of claim 4 wherein said third means is a feed gas flow controller adapted to receive said second signal and control the input flow of said fuel gas whereby constant heat input is automatically and continually maintained.

References Cited by the Examiner

UNITED STATES PATENTS 1,849,335  3/1932  Schmidt.
3,211,372  10/1965  Hamilton _____ 236—15

OTHER REFERENCES

Special Purpose Computers, etc.; Automatic Control, volume 8, No. 5, May 1958; pages 43–47.

JAMES W. WESTHAVER, *Primary Examiner.*